US012177575B2

(12) United States Patent
Lee et al.

(10) Patent No.: US 12,177,575 B2
(45) Date of Patent: Dec. 24, 2024

(54) PHOTOGRAPHING METHOD OF ELECTRONIC APPARATUS AND ELECTRONIC APPARATUS THEREOF

(71) Applicant: Samsung Electronics Co., Ltd., Gyeonggi-do (KR)

(72) Inventors: Bohee Lee, Gyeonggi-do (KR); Sungoh Kim, Gyeonggi-do (KR); Hajeong Kim, Gyeonggi-do (KR); Jiyoon Park, Gyeonggi-do (KR); Byungho Ahn, Gyeonggi-do (KR); Jaehee Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 17/939,095

(22) Filed: Sep. 7, 2022

(65) Prior Publication Data
US 2023/0007160 A1 Jan. 5, 2023

Related U.S. Application Data

(63) Continuation of application No. PCT/KR2022/004499, filed on Mar. 30, 2022.

(30) Foreign Application Priority Data

May 21, 2021 (KR) .................. 10-2021-0065646

(51) Int. Cl.
H04N 23/74 (2023.01)
G06T 7/70 (2017.01)
(Continued)

(52) U.S. Cl.
CPC ............... *H04N 23/74* (2023.01); *G06T 7/70* (2017.01); *H04N 23/56* (2023.01); *H04N 23/71* (2023.01); *G06T 2207/30244* (2013.01)

(58) Field of Classification Search
None
See application file for complete search history.

(56) References Cited

U.S. PATENT DOCUMENTS 1,062,977 A 5/1913 Kops
7,567,292 B2 7/2009 Tadaki
(Continued)

FOREIGN PATENT DOCUMENTS

JP 2009-80846 A 4/2009
JP 2013-78112 A 4/2013
(Continued)

Primary Examiner — Samuel D Fereja
(74) Attorney, Agent, or Firm — Cha & Reiter, LLC

(57) ABSTRACT

An electronic apparatus and method are disclosed herein. The electronic device includes at least one camera, a distance sensor, an illumination sensor, a display, a light-emitting module configured to generate a flash, and a processor. The processor implements the method, including: displaying a camera preview image, acquiring a distance between the apparatus and an object depicted in the preview image, acquiring a brightness in the local environment, detecting whether a shadow of the electronic apparatus is depicted in the preview image, based on the acquired distance and the acquired brightness, detecting whether a shadow is disposed within the field-of-view of the camera, and in response to detecting the shadow of, configuring a brightness value for a flash to reduce the shadow.

20 Claims, 19 Drawing Sheets

(51) Int. Cl.
*H04N 23/56* (2023.01)
*H04N 23/71* (2023.01)

(56) References Cited

U.S. PATENT DOCUMENTS

| | | |
|---|---|---|
| 7,920,179 B2 | 4/2011 | Thorn |
| 10,122,935 B2 | 11/2018 | Jung et al. |
| 2009/0141027 A1 | 6/2009 | Sato et al. |
| 2013/0070117 A1* | 3/2013 | Imagawa ............... H04N 23/74 |
| | | 348/222.1 |
| 2015/0049211 A1 | 2/2015 | Lim |
| 2016/0112621 A1* | 4/2016 | Nishi .................... G03B 15/02 |
| | | 315/153 |
| 2018/0025476 A1 | 1/2018 | Akahane |
| 2020/0236258 A1* | 7/2020 | Hu ......................... H04N 23/74 |

FOREIGN PATENT DOCUMENTS

| | | |
|---|---|---|
| JP | 2015-99979 A | 5/2015 |
| JP | 2016-81677 A | 5/2016 |
| JP | 2017-123069 A | 7/2017 |
| JP | 2018-14646 A | 1/2018 |
| KR | 10-2009-0071335 A | 7/2009 |
| KR | 10-2063102 B1 | 12/2019 |

\* cited by examiner

PHOTOGRAPHING METHOD OF ELECTRONIC APPARATUS AND ELECTRONIC APPARATUS THEREOF

CROSS-REFERENCE TO RELATED APPLICATION(S)

This application is a continuation of International Application No. PCT/KR2022/004499, which was filed on Mar. 30, 2022, and claims priority to Korean Patent Application No. 10-2021-0065646, filed on May 21, 2021, in the Korean Intellectual Property Office, the disclosures of which are incorporated by reference herein their entirety.

BACKGROUND

Technical Field

Certain embodiments according to the disclosure relate to digital photography, and, more particularly, to reducing a shadow incident from an electronic device or user by controlling a flash brightness of the electronic device.

Description of Related Art

Generally, camera modules for use in electronic devices, such as portable terminals, include a flash which may provide light for photographic capture in dark environments.

When these cameras are used to capture a subject, a photographic condition may depend upon a degree of illuminance in the surrounding environment. With indoor and nighttime photography in particular, environmental illumination is very low, and consequently, a flash is often utilized to generate a burst of light for to adequately capture subjects into photography. The light generated by a flash may sometimes be similar or identical to that of sunlight, in terms of quantity of light, color temperature. The flash is often a burst generated for a very short period of time, and may thus improve environmental illumination in capture in such environments, assuming an appropriate degree of exposure.

SUMMARY

When a portable terminal, such as a mobile phone, is used to capture images, the terminal itself may cast a shadow on the subject being photographed. When the subject is shadowed, the resulting photograph may not possess the quality desired by the user. For example, the subject may be hard to perceive, and alphanumeric characters included therein may be difficult to read.

To avoid this result, a user will reposition the portable terminal such that the shadow is no longer cast over the subject. However, even here, changing the angle or position of the mobile terminal may interfere with the desired composition of the photograph. Similarly, if the flash function is triggered, the brightness of the flash is constant regardless of the photographic situation, and thus, the quality of the resulting photograph is unpredictable for the user.

Technical problems to be solved by the disclosure are not limited to the above-mentioned technical problems, and other technical problems not mentioned herein will be clearly understood from the following description by those skilled in the art to which the disclosure pertains.

In certain embodiments, an electronic apparatus is disclosed, including at least one camera, a distance sensor, an illumination sensor, a display, a light-emitting module configured to generate a flash while capturing an image by using the at least one camera, and at least one processor electrically connected to the at least one camera, the distance sensor, the illumination sensor, the display, and the light-emitting module, wherein the at least one processor is configured to display, on the display, an image acquired by driving the at least one camera as a preview image, acquire, via at least one of the distance sensor or the at least one camera, a distance between the electronic apparatus and at least one object depicted within the preview image, acquire, via the illumination sensor, a brightness of a light source of light incident to an environment captured in a field-of-view (FOV) of the at least one camera, based on the acquired distance and the acquired brightness, detect whether a shadow of the electronic apparatus generated at least in part by the light source is disposed within the FOV of the at least one camera, and in response to detecting the shadow of the electronic apparatus in the FOV, configure a brightness value for the flash so as to at least reduce the shadow when the flash is generated.

In certain embodiments, a method for operating an electronic apparatus is disclosed, including: displaying, via a display, an image acquired by driving at least one camera as a preview image, acquiring, via at least one of a distance sensor or the at least one camera, a distance between the electronic apparatus and at least one object depicted in the preview image, acquiring, using an illumination sensor, a brightness of a light source of light incident to an environment captured in a field-of-view (FOV) of the at least one camera, detecting, based on the acquired distance and the acquired brightness, whether a shadow of the electronic apparatus generated at least in part by the light source is disposed within the FOV of the at least one camera, and in response to detecting the shadow of the electronic apparatus in the FOV, configuring a brightness value for a flash so as to at least reduce the shadow when the flash is generated.

In certain embodiments, a non-transitory recording medium configured to store instructions readable by at least one processor of an electronic apparatus is disclosed, the instructions executable to cause the apparatus to: display, on the display, an image acquired by driving a at least one camera as a preview image, acquire, via at least one of a distance sensor or the at least one camera, a distance between the electronic apparatus and at least one object depicted within the preview image, acquire, via an illumination sensor, a brightness of a light source having light incident to an environment captured in a field-of-view (FOV) of the at least one camera, based on the acquired distance and the acquired brightness, detect whether a shadow of the electronic apparatus generated at least in part by the light source is disposed within the FOV of the camera, and in response to detecting the shadow of the electronic apparatus in the FOV, configure a brightness value for a flash so as to at least reduce the shadow when the flash is generated.

An electronic apparatus and a method in certain embodiments of the disclosure may analyze a preview image and adjust a brightness of a flash, thereby reducing or removing shadows while maintaining a predictable degree of captured image quality.

Advantageous effects obtainable from the disclosure are not limited to the above-mentioned advantageous effects, and other advantageous effects not mentioned herein will be clearly understood by those skilled in the art to which the disclosure pertains.

BRIEF DESCRIPTION OF THE DRAWINGS

In describing the drawings, identical or similar reference numerals may be used to designate identical or similar constituent elements.

DETAILED DESCRIPTION

Figure 1:
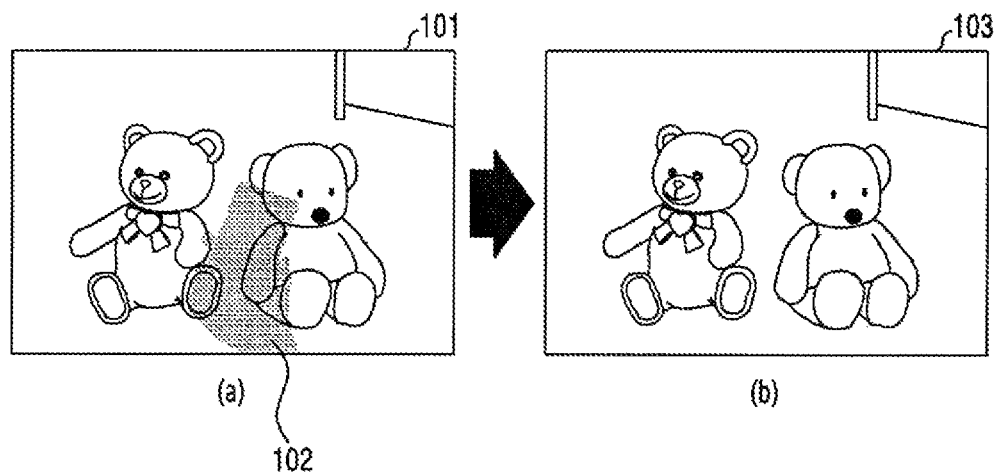
FIG. 1 illustrates an image of a subject, captured by an electronic apparatus according to certain embodiments, based on flash brightness in the electronic apparatus.

FIG. 1 illustrates images based on flash brightness when an electronic apparatus according to certain embodiments captures an image of a subject.

Referring to FIG. 1A, an electronic apparatus, according to an embodiment, may display an image acquired via operation of a camera, as a preview image on a display. For example, the electronic apparatus may display a preview image acquired by driving a rear camera on the display, or may display a preview image acquired by driving a front camera on the display. According to an embodiment, the preview image may be displayed by the electronic apparatus upon executing a camera application, stored in memory, activating the camera and initiating capture to generate the preview image. As some electronic devices have multiple cameras, a front-facing or rear-facing camera may be utilized.

According to an embodiment, the electronic apparatus may capture an image of at least one object depicted within the preview image. In some embodiments, a flash may be utilized to provide illumination for capture. For example, in FIG. 1, the flash may be operated at a first flash brightness to acquire a first image 101. According to an embodiment, in the first image 101 in which the flash was activated at the first brightness value, a shadow 102 of the electronic apparatus may also be captured. The shadow may be caused by a light source (e.g., a light) disposed in the external environment around the electronic apparatus.

Referring to FIG. 1B, the electronic apparatus according to an embodiment may display a preview image on the display, as acquired by driving the front camera or the rear camera. According to an embodiment, as mentioned above, the electronic apparatus executes a camera application from memory, the preview image may be displayed, which displays an image captured via a front or rear-facing camera of the electronic apparatus.

According to an embodiment, the electronic apparatus may utilize a distance sensor to acquire detect a distance between the electronic apparatus and at least one object depicted in the preview image. According to an embodiment, when displaying an image acquired through the rear camera as a preview image on the display, the electronic apparatus may use, for example, the rear camera to detect the distance between the electronic apparatus and at least one object included in the preview image. According to another embodiment, when displaying an image acquired through the front camera as a preview image on the display, the electronic apparatus may use the front camera to detect the distance between the electronic apparatus and at least one object included in the preview image. According to an embodiment, the electronic apparatus may use an illumination sensor to acquire information about the brightness of a light source in the external environment around the electronic apparatus.

According to an embodiment, the electronic apparatus may configure the brightness of a flash to be second brightness value, based on the acquired distance information and the acquired bright information. According to an embodiment, the electronic apparatus may capture an image of the at least one object included in the preview image while operation the flash at the second brightness value to acquire a second image 103. According to an embodiment, in the second image 103 in which the second brightness was applied, the shadow of the electronic apparatus (e.g., as caused by the environmental light source, such as a light) does not appear. Alternatively, in the second image 103, the illumination difference between a region of the shadow 102 of the electronic apparatus appearing in the first image 101 and other regions of the image may be sufficiently small that the shadow is not prominent.

Configuring the brightness of the flash to a certain brightness value may mean determining a control value for controlling the light emitting module to generate a flash in associated with the brightness value. The electronic apparatus may control the light emitting module based on the determined control value to generate a flash.

Figure 2:
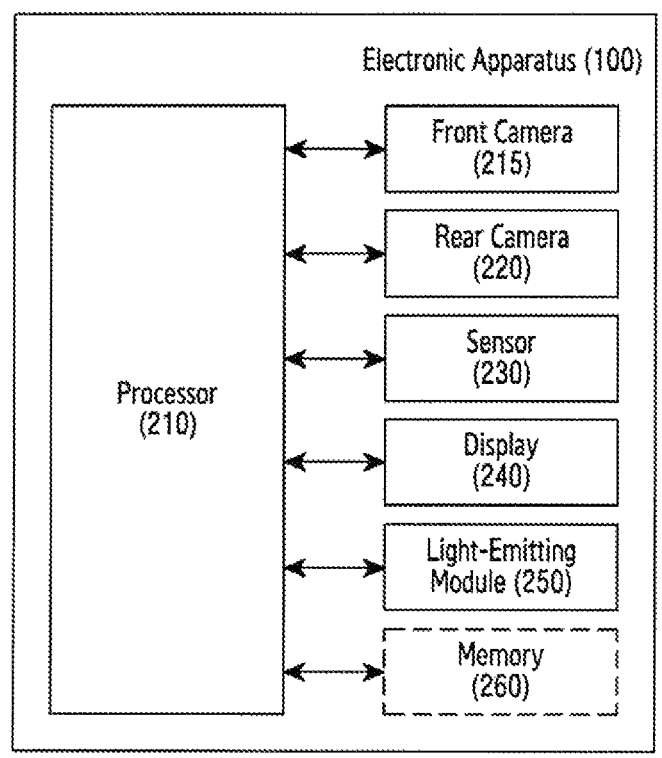
FIG. 2 is a block diagram illustrating elements of an electronic apparatus according to an embodiment.

FIG. 2 is a block diagram of an electronic apparatus according to an embodiment.

Referring to FIG. 2, the electronic apparatus 100 may include a processor 210, a front camera 215, a rear camera 220, a sensor 230, a display 240, a light-emitting module 250, and a memory 260. In certain embodiments, the electronic apparatus 100 may include additional elements in addition to the elements illustrated in FIG. 2, or at least one of the elements illustrated in FIG. 2 may be omitted.

According to an embodiment, the processor 210 may use instructions stored in the memory 260 to control at least one other element of the electronic apparatus 100, and/or to perform data processing or calculations. According to an embodiment, the processor 210 may include at least one of a central processing unit (CPU), a graphics processing unit (GPU), a micro controller unit (MCU), a sensor hub, a supplementary processor, a communication processor, an application processor, an application specific integrated circuit (ASIC), and a field programmable gate array (FPGA), and may include multiple cores (e.g., as a multi-core processor).

According to an embodiment, the processor 210 may execute an application (e.g., a camera application) stored in the memory 260. According to an embodiment, the processor 210 may acquire an image using a front camera 215 or a rear camera 220 while the camera application is executed. The application may be a predetermined application that utilizes the front camera 215 or the rear camera 220.

According to an embodiment, the processor 210 may display the image, as acquired using the front camera 215 or the rear camera 220, as a preview image on the display 240. According to an embodiment, the processor 210 may utilize the sensor 230 (e.g., a distance sensor or a depth sensor) to acquire information about a distance to an object included in the preview image. According to an embodiment, the processor 210 may utilize the front camera 215 or the rear camera 220 to acquire information about a distance to an object included in the preview image. According to an embodiment, the processor 210 may utilize the sensor 230 (e.g., an illumination sensor) to acquire information about brightness around the electronic apparatus 100. A detailed description related to an operation of the processor 210 will be made later with reference to FIGS. 3A and 3B.

According to an embodiment, the front camera 215 or the rear camera 220 may acquire (or capture) an image (e.g., a still image and/or a moving image). For example, an image signal processor (not shown) electrically connected to the front camera 215 or the rear camera 220 may distinguish between an object depicted in the image (e.g., a person) and a background depicted in the image (e.g., a preview image, or an image stored in the memory 260). According to certain embodiments, the front camera 215 and the rear camera 220 may be referred to in different nomenclature. For example, the front camera 215 may be referred to as a first camera or a second camera, and the rear camera 220 may also be referred to as a first camera or a second camera. For example, when the front camera 215 is referred to as a first camera, the rear camera 220 may be referred to as a second camera. Furthermore, for example, when the front camera 215 is referred to as a second camera, the rear camera 220 may be referred to as a first camera.

According to an embodiment, the image signal processor may be separate from the front camera 215 or the rear camera 220, or may be implemented as a part of the processor 210. According to an embodiment, the front camera 215 or the rear camera 220 may include an image sensor. According to an embodiment, the image sensor may acquire and process color information. According to an embodiment, when the rear camera 220 captures an image, the front camera 215 may operate in a background state, and when the front camera 215 captures an image, the rear camera 220 may operate in the background state.

According to an embodiment, the sensor 230 may include at least one among a depth sensor, a time-of-flight or "ToF" sensor, and an image sensor. According to an embodiment, the depth sensor may measure a depth of an external object, and may utilize the measured depth to generate depth information corresponding to the external object. According to an embodiment, the sensor 230 may be operatively connected to at least one or more of the processor 210, the front camera 215, the rear camera 220, and the memory 260, and the operative connection may aid in processing color information, 3D information, distance information, position information, etc.

According to an embodiment, the sensor 230 may include an illumination sensor. According to an embodiment, the illumination sensor may measure the illumination of a region or environment around the electronic apparatus 100. According to an embodiment, the illumination sensor may measure an exterior illumination using the intensity of light entering from the an exterior environment. According to an embodiment, the illumination sensor may receive environmental light in order to determine (or identify; detect) the illumination of an environment in which the electronic apparatus 100 is disposed.

The display 240 according to an embodiment may display an image acquired through the front camera 215 or the rear camera 220. According to an embodiment, the display 240 may display the image acquired through the front camera 215 or the rear camera 220 as a preview image. According to an embodiment, the electronic apparatus 100 may acquire a user input through the display 240, and may transmit the user input to the processor 210.

According to an embodiment, the light-emitting module 250 (e.g., a flash) may generate light such that an image may be captured with improved quality and visibility in a dark environment. According to an embodiment, the light-emitting module 250 may be oriented to face a same direction (e.g., the front surface direction of the electronic apparatus 100 or the rear surface direction of the electronic apparatus 100) as a camera (e.g., the front camera 215 or the rear camera 220). According to an embodiment, operations of the camera (e.g., the front camera 215 or the rear camera 220) and of the light-emitting module 250 may be interlinked. For example, when the electronic apparatus 100 receives an photographic capture command, the electronic apparatus 100 may utilize the sensor 230 to determine environmental illumination, and then activate capture by the camera (e.g., the front camera 215 or the rear camera 220) and light emission by the light-emitting module 250 simultaneously. According to an embodiment, the electronic apparatus 100 may acquire an image using the camera (e.g., the front camera 215 or the rear camera 220) at the same time that light is emitted from the light-emitting module 250 to illuminate the capture environment. According to an embodiment, the electronic apparatus 100 may thereby acquire an image including light emitted from the light-emitting module 250.

According to an embodiment, the memory 260 may imply a set of one or more memories. According to an embodiment, the memory 260 may store data and/or commands received from the other elements (e.g., the processor 210, the front camera 215, the rear camera 220, the sensor 230, and the display 240) or generated by the other elements. In certain embodiments, the memory 260 may store an application using the camera.

Figure 3A:
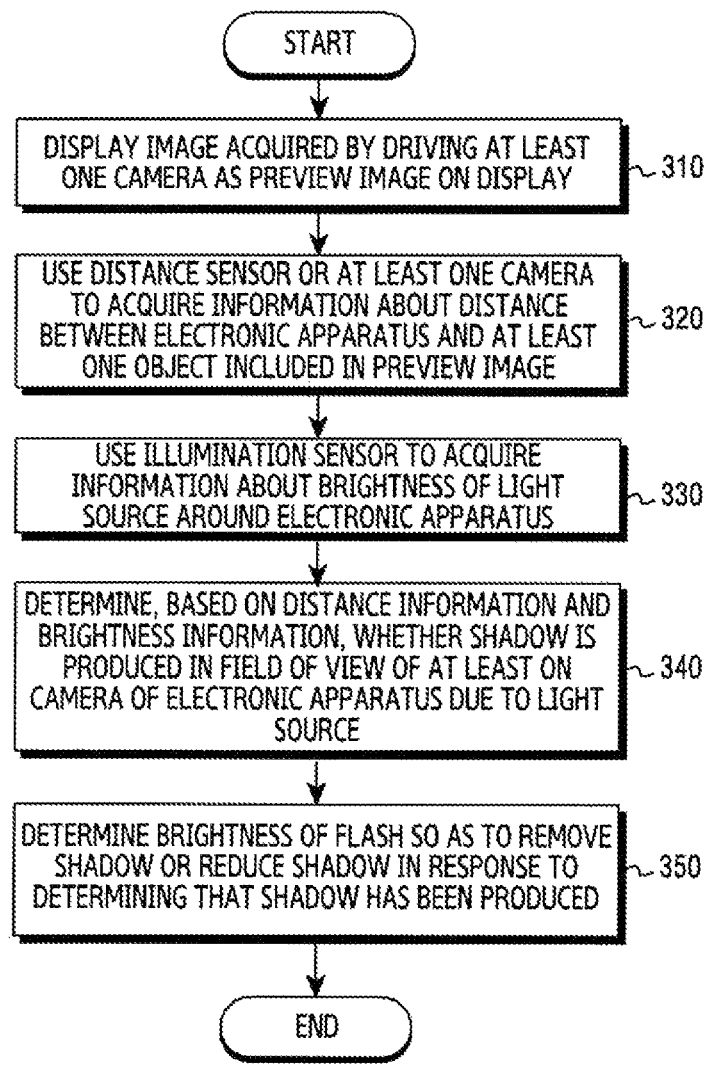
FIG. 3A is a flowchart illustrating an operation in which an electronic apparatus according to an embodiment determines flash brightness, based on information about a distance to a subject and information about brightness around the electronic apparatus.

FIG. 3A is a flowchart illustrating an operation in which an electronic apparatus according to an embodiment determines flash brightness, based on information about a distance to a subject and information about brightness around the electronic apparatus. In an embodiment below, operations may be performed in sequencer, but may not be necessarily performed in sequence. For example, order of each of the operations may be changed, and at least two operations may be performed in parallel.

Referring to FIG. 3A, in operation 310, the processor 210 according to an embodiment may display an image acquired by driving at least one camera as a preview image on a display. According to an embodiment, the processor 210 may display an image acquired using the front camera 215 or the rear camera 220 as a preview image on the display 240. According to an embodiment, the processor 210 may display a preview image, as acquired using the front camera 215 or the rear camera 220 while a camera application stored in the memory 260 is executed.

According to an embodiment, in operation 320, the processor 210 may use a distance sensor or at least one camera to acquire information on a distance between the electronic apparatus and at least one object included in a preview image. According to an embodiment, the processor 210 may use the sensor 230 (e.g., a depth sensor or a ToF sensor) to acquire depth information and/or distance information for the at least one object included in the preview image. According to an embodiment, the processor 210 may alternatively or additionally use at least one camera to acquire distance information of the at least one object included in the preview image. For example, when displaying an image acquired by driving the front camera 215 as a preview image on the display 240, the processor 210 may utilize the front camera 215 to acquire distance information of an object included in the preview image. Furthermore, for example, when displaying an image acquired by driving the rear camera 220 as a preview image on the display 240, the processor 210 may utilize the rear camera 220 to acquire distance information of an object included in the preview image.

According to an embodiment, in operation 330, the processor 210 may utilize an illumination sensor to acquire information on a brightness of a light source illuminating the environment around the electronic apparatus 100. According to an embodiment, the processor 210 may activate the illumination sensor in response the occurrence of an event, and may use the illumination sensor to measure illumination around the electronic apparatus 100. According to an embodiment, the processor 210 may use an exposure time of the camera (e.g., the front camera 215 or the rear camera 220) or the illumination sensor to measure the brightness of a light source (or a light) around the electronic apparatus 100.

According to an embodiment, in operation 340, the processor 210 may determine, based on one or more of the distance information and the brightness information, whether a shadow of the electronic apparatus is produced within the field of view (FOV) of the front camera 215 or the rear camera 220, due to the light source. According to an embodiment, when it is determined that the distance between the front camera 215 or the rear camera 220 and a subject is less than a threshold value, the processor 210 may determine that the shadow of the electronic apparatus 100 is produced due to the light source.

According to an embodiment, when it is determined that the brightness of the light source around the electronic apparatus 100 is equal to or higher than a threshold value, the processor 210 may determine that a shadow of the electronic apparatus 100 is produced due to the light source. According to an embodiment, when the distance between the front camera 215 or the rear camera 220 and a subject is determined to be less than the threshold value and when the brightness of the light source around the electronic apparatus 100 is determined to be equal to or higher than the threshold value, the processor 210 may determine that a shadow of the electronic apparatus 100 is produced due to the light source.

According to an embodiment, when the distance between the front camera 215 or the rear camera 220 and a subject is determined to be less than the threshold value and when the brightness of the light source around the electronic apparatus 100 is determined to be lower than the threshold value, the processor 210 may determine that a shadow of the electronic apparatus 100 has not been produced due to the light source. According to an embodiment, when the distance between the front camera 215 or the rear camera 220 and a subject is determined to be equal to or greater than the threshold value and when the brightness of the light source around the electronic apparatus 100 is determined to be equal to or higher than the threshold value, the processor 210 may determine that a shadow of the electronic apparatus 100 is not produced due to the light source.

According to an embodiment, in operation 350, in response to determining that the shadow is produced, the processor 210 may configure a brightness value of the flash so as to remove the shadow or reduce the shadow during photographic capture.

According to an embodiment, when it is determined that the shadow is produced, the processor 210 may determine an intensity of the shadow. According to an embodiment, the processor 210 may determine the intensity of the shadow, based on information about the distance to the subject and information about surrounding brightness. For example, the shorter the distance between the subject and the electronic apparatus 100 is, the higher the intensity of the shadow will be. Furthermore, the brighter the lighting is, the higher the intensity of the shadow is. For example, may configure the brightness value of the flash to be higher as the distance is shorter or the environment is brighter. Accordingly, a variety distances and lighting values may be associated with pre-set shadow intensity values. When the a particular distance and/or lighting value is detected, the associations may be utilized to retrieve a shadow intensity value. The processor 210 may then determine the brightness of lighting, based on an illumination value. For example, the processor 210 may determine the brightness of lighting by analyzing an illumination value detected using the illumination sensor or an image acquired through the camera.

According to an embodiment, when it is determined that the shadow is produced, the processor 210 may determine the reflectance of a subject included in the preview image. According to an embodiment, the processor 210 may analyze an image acquired through the front camera 215 or the rear camera 220 to determine the reflectance of at least one subject included in the image.

According to an embodiment, the processor 210 may determine the brightness of the flash, based on determining the intensity of the shadow and/or the reflectance of the object (the subject), when the shadow is produced. According to an embodiment, the processor 210 may control the light-emitting module 250 such that the brightness of the flash is proportional to the intensity of the shadow, and inversely proportional to the reflectance of the subject. For example, the processor 210 may increase the brightness of the flash as the intensity of the shadow increases. Furthermore, for example, the processor 210 may also reduce the brightness of the flash to become lower as the reflectance of the subject increases. Process for determining the brightness of the flash based on the intensity of the shadow and/or the reflectance of the object (the subject) may be configured to in various ways. For example, the processor 219 may determine the brightness value of the flash by inputting the intensity of the shadow and/or the reflectance of the object to a predetermined function. As another example, the processor 210 may obtain the brightness value of the flash from a lookup table including a pair of the brightness value of the flash and the intensity of the shadow, and/or the reflectivity of the object.

Figure 3B:
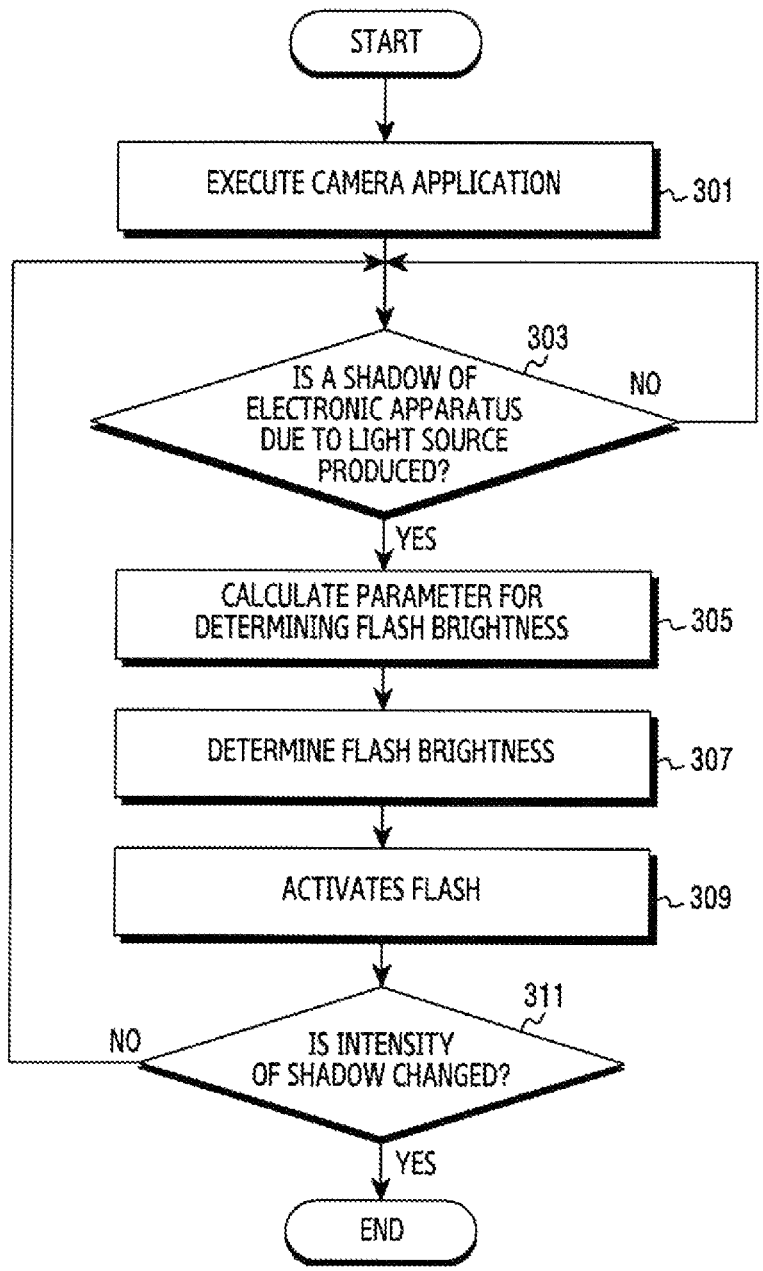
FIG. 3B is a flowchart illustrating that the brightness of a flash is determined based on a parameter calculated in an electronic apparatus according to an embodiment.

FIG. 3B is a flowchart illustrating that the brightness of a flash is determined based on a parameter calculated in an electronic apparatus according to an embodiment. In relation to FIG. 3B, a description, which is similar to or overlaps the above descriptions, will be briefly made or omitted.

Referring to FIG. 3B, in operation 301, the processor 210 according to an embodiment may execute a camera application. According to an embodiment, in accordance with execution of the camera application, the processor 210 may drive a camera to acquire an image (or a video). According to an embodiment, the processor 210 may execute an application using a camera, that is stored in the memory 260.

According to an embodiment, in operation 303, the processor 210 may determine whether a shadow of the electronic apparatus 100 due to a light source is produced (e.g., depicted in the preview image). According to an embodiment, the processor 210 may determine, based on information about the distance between a subject and the electronic apparatus 100 and/or information about the brightness of a light source around the electronic apparatus 100, whether a shadow of the electronic apparatus 100 or a shadow of a user is produced.

According to an embodiment, when it is determined that the distance between the front camera 215 or the rear camera 220 and the subject is less than a threshold value, the processor 210 may determine that a shadow of the electronic apparatus 100 is produced due to the light source. According to an embodiment, when it is determined that the brightness of the light source around the electronic apparatus 100 is equal to or higher than a threshold value, the processor 210 may determine that a shadow of the electronic apparatus 100 is produced due to the light source.

According to an embodiment, in operation 305, when it is determined that the shadow of the electronic apparatus has been produced, the processor 210 may calculate a parameter for determining flash brightness. According to an embodiment, when it is determined that the shadow has been produced, the processor 210 may calculate a parameter including at least one among the angle between the light source and the electronic apparatus 100, the distance between the subject and the electronic apparatus 100, the reflectance of the subject, and the intensity of the shadow.

According to an embodiment, when it is determined that no shadow of the electronic apparatus has been produced, the processor 210 may monitor occurrence of the shadow by performing operation 303 while the camera application is executed.

According to an embodiment, when the shadow is detected as produced, then in operation 307, the processor 210 may determine a flash brightness (e.g., set a brightness value). According to an embodiment, the processor 210 may determine the flash brightness, based on calculating at least one parameter. The calculated parameter may include at least one or more of an angle between the light source and the electronic apparatus 100, a distance between the subject and the electronic apparatus 100, a reflectance of the subject, and an intensity of the shadow. For example, the processor 210 may set the flash brightness value to be proportional to the intensity of the shadow, and inversely proportional to the reflectance of the subject.

According to an embodiment, in operation 309, the processor 210 may activate the flash. According to an embodiment, the processor 210 may activate the flash in response to determining the brightness of the flash.

According to an embodiment, in operation 311, the processor 210 may determine whether the intensity of the shadow of the electronic apparatus is changed after activation of the flash. According to an embodiment, the processor 210 may analyze the image acquired through the front camera 215 or the rear camera 220 to determine whether the intensity of a shadow produced by the electronic apparatus 100 or the user is changed during activation of the flash.

According to an embodiment, when it is determined the intensity of the shadow of the electronic apparatus has not changed, the processor 210 may return to operation 303 to attempt reconfiguration of the brightness value, so as to reduce the shadow intensity. According to an embodiment, when it is determined the intensity of the shadow of the electronic apparatus has changed, the processor 210 may end the operation thereof. Operation 311 is not limited as FIG. 3B. For example, when it is determined the intensity of the shadow of the electronic apparatus has not been changed, the processor 210 may return to operation 305 to attempt reconfiguration of the brightness value, so as to reduce the shadow intensity. When it is determined the intensity of the shadow of the electronic apparatus has been changed, the processor 201 may return to operation 303 while the camera application is executed.

Figure 4A:
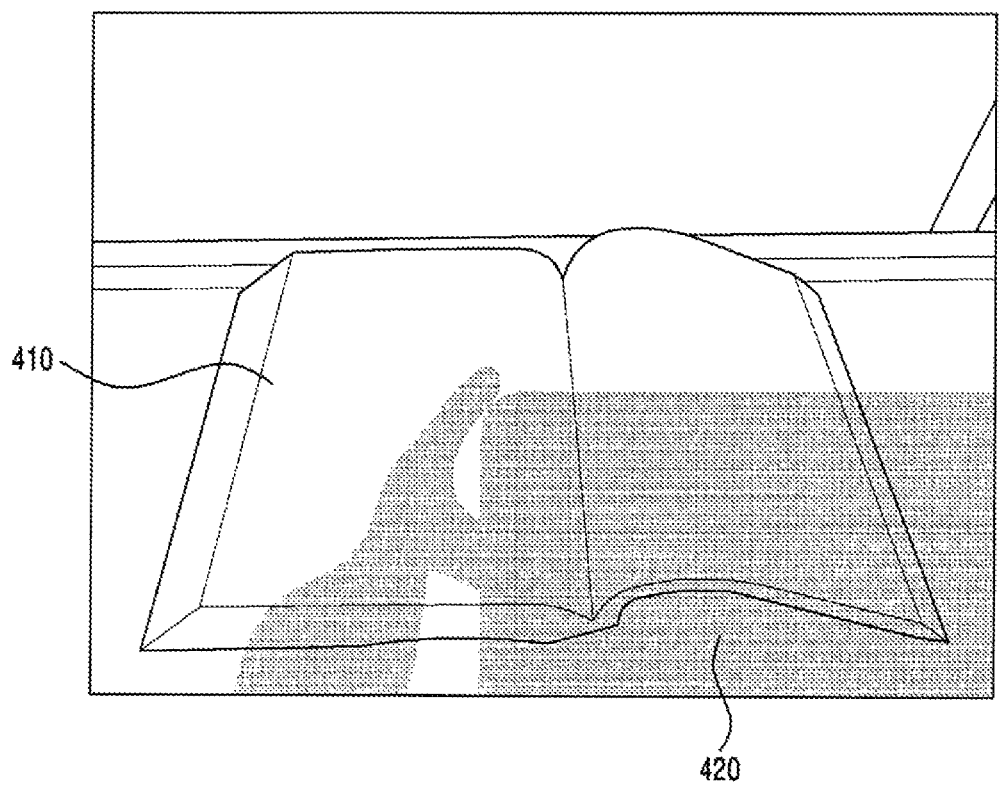
FIGS. 4A and 4B illustrate that whether a shadow occurs varies depending on a distance to a subject when an electronic apparatus according to certain embodiments captures an image of the subject.
Figure 4B:
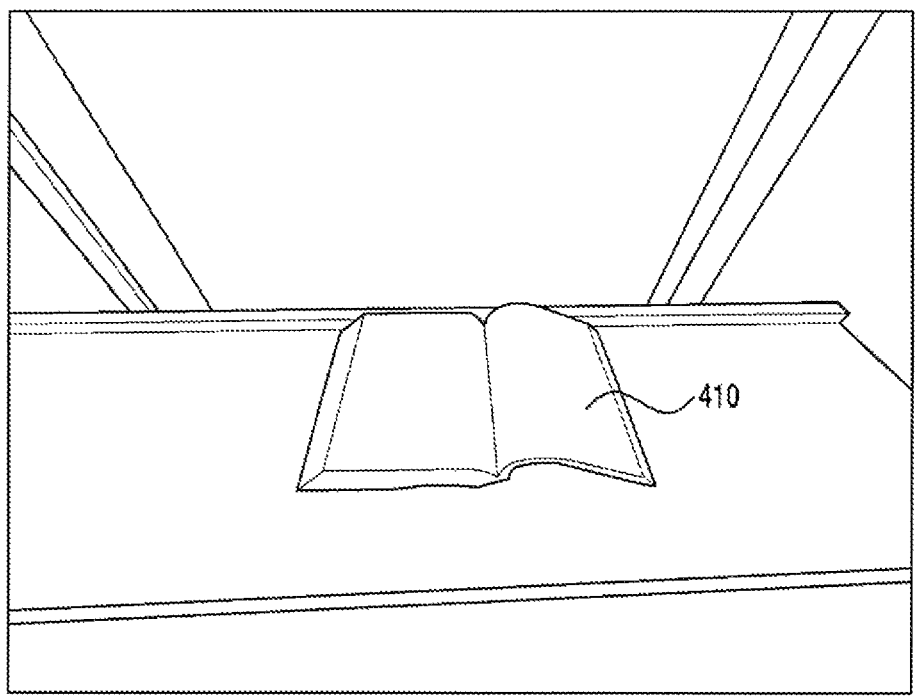

FIGS. 4A and 4B illustrate that occurrence of a shadow varies depending on a distance to a subject when an electronic apparatus according to certain embodiments captures an image of the subject.

Referring to FIG. 4A, when the brightness of a light source around the electronic apparatus 100 is a first brightness value, and when the distance between a subject 410 and the front camera 215 or the rear camera 220 is less than a threshold value, a shadow 420 may be incident within the preview image. For example, the processor 210 according to an embodiment may display an image acquired by driving the front camera 215 or the rear camera 220 as a preview image on the display 240. According to an embodiment, the processor 210 may analyze the preview image and detect that a shadow 420 of the electronic apparatus 100 and/or a user is produced, due to interaction of the electronic apparatus 100 and/or the user with a light source in the environment of the electronic apparatus 100. In some embodiments, when the distance between the subject 410 and the front camera 215 or the rear camera 220 is less than the threshold value, a shadow of threshold intensity is produced. The reasoning is a shorter distance between the subject 410 and the front camera 215 or the rear camera 220, tends to produce a deeper shadow of higher intensity.

Referring to FIG. 4B, when the brightness of a light source around the electronic apparatus 100 is the same first brightness value, and when the distance between a subject 410 and the front camera 215 or the rear camera 220 is equal to or greater than a threshold value, no discernable shadow may be formed or captured in the preview image. For example, the processor 210 according to an embodiment may display an image acquired by driving the front camera 215 or the rear camera 220 as a preview image on the display 240. According to an embodiment, the processor 210 may analyze the preview image to identify that no shadow of the electronic apparatus 100 or the user has been produced from interaction with the light source around the electronic apparatus 100.

FIGS. 5A to 5D illustrate that the intensity of a shadow varies depending on brightness around an electronic apparatus in the electronic apparatus according to certain embodiments.

Figure 5A:
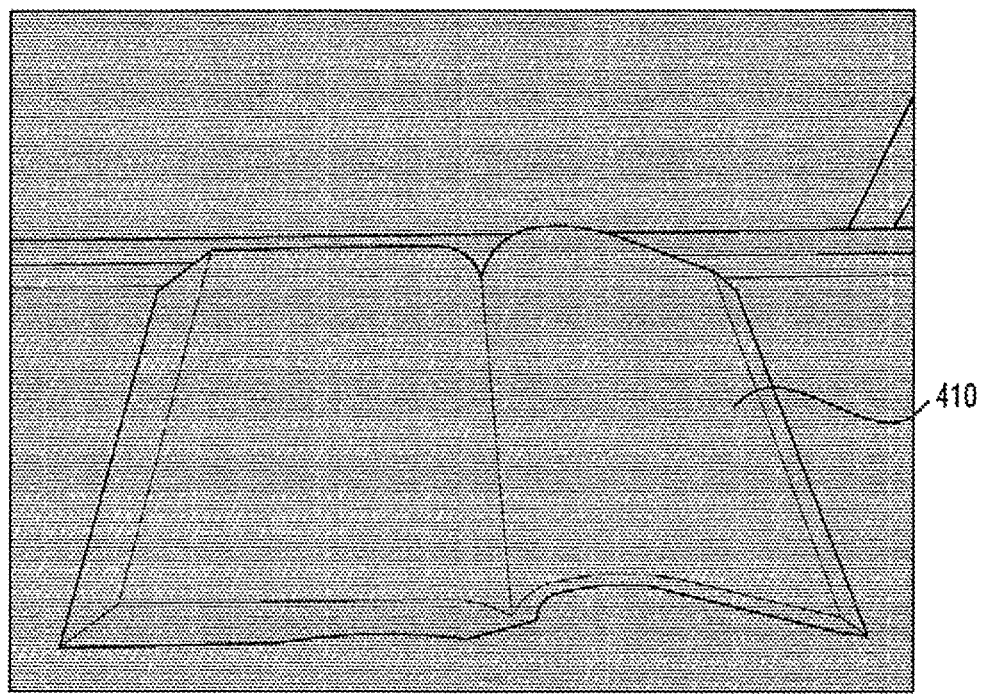
FIGS. 5A to 5D illustrate that the intensity of a shadow varies depending on brightness around an electronic apparatus in the electronic apparatus according to certain embodiments.

Referring to FIG. 5A, when the distance between a subject 410 and the rear camera 220 is a first distance less than a threshold value, and when the brightness of a light source around the electronic apparatus 100 is first brightness lower than a threshold value, the processor 210 according to an embodiment may display an image acquired by driving the rear camera 220 as a preview image on the display 240. According to an embodiment, the processor 210 may analyze the preview image to determine that a shadow of the electronic apparatus 100 or a user has not been produced due to the light source around the electronic apparatus 100.

Figure 5B:
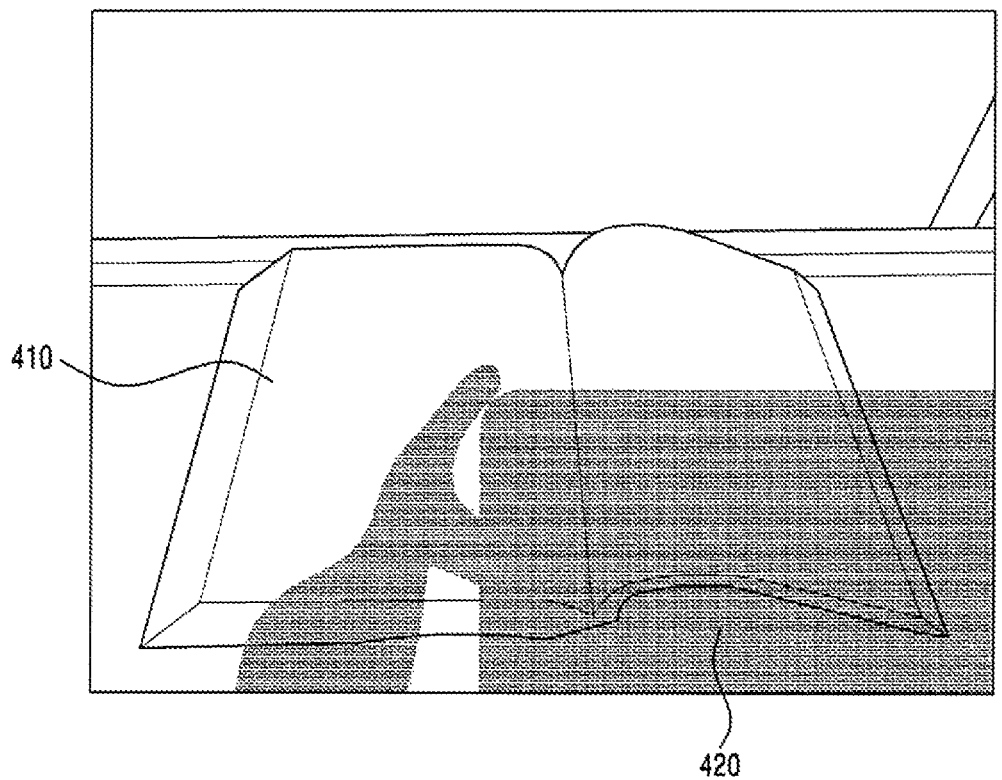

Referring to FIG. 5B, when the distance between a subject 410 and the rear camera 220 is first distance less than a threshold value, and when the brightness of a light source around the electronic apparatus 100 is second brightness equal to or higher than a threshold value, a dark shadow may be produced. For example, the processor 210 according to an embodiment may display an image acquired by driving the rear camera 220 as a preview image on the display 240. The shadow 420 may be captured in the preview image, having a first intensity.

Figure 5C:
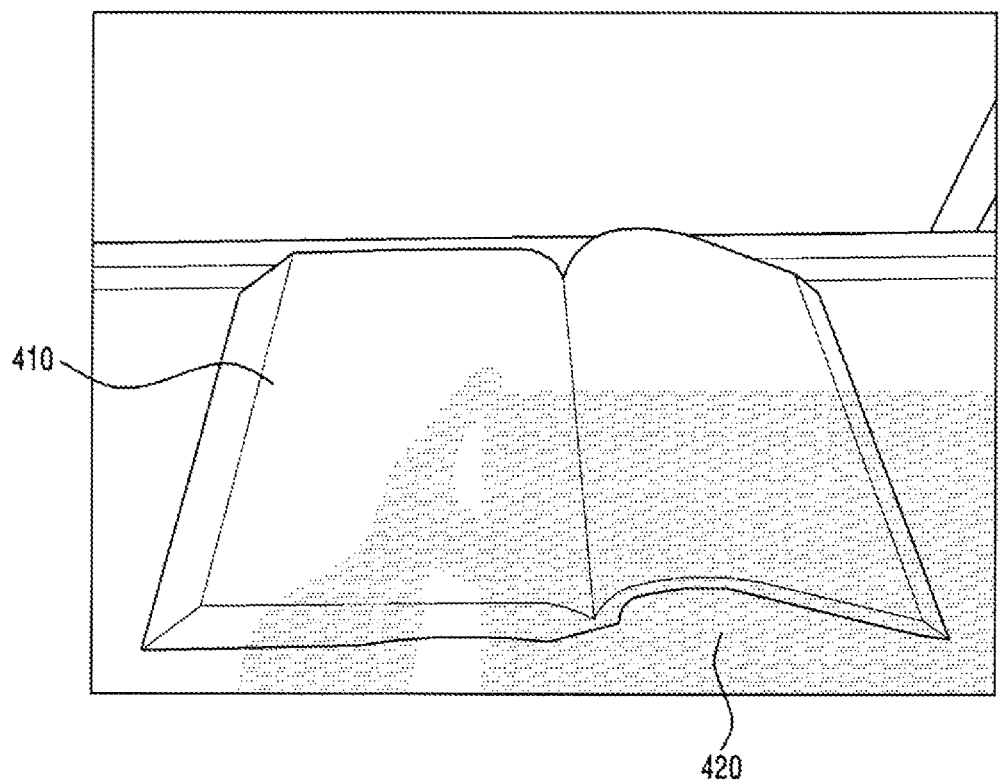

Referring to FIG. 5C, when the distance between a subject 410 and the rear camera 220 is a first distance less than a threshold value, and when the brightness of a light source around the electronic apparatus 100 is third brightness equal to or higher than a threshold value, the processor 210 according to an embodiment may display an image acquired by driving the rear camera 220 as a preview image on the display 240, in which the shadow 420 is captured, having a second intensity lighter than the first intensity.

Figure 5D:
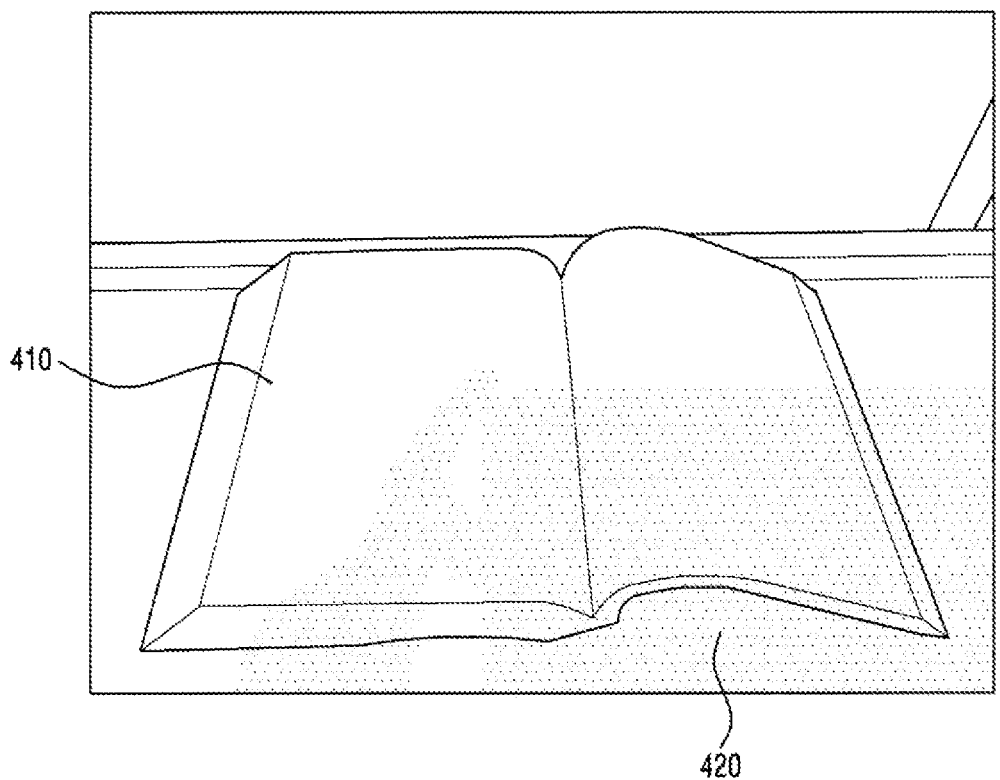

Referring to FIG. 5D, when the distance between a subject 410 and the rear camera 220 is a first distance less than a threshold value, and when the brightness of a light source around the electronic apparatus 100 is fourth brightness equal to or higher than a threshold value, a shadow may be produced. For example, the processor 210 according to an embodiment may display an image acquired by driving the rear camera 220 as a preview image on the display 240, in which a shadow 420 is captured, as seen, having a third intensity lighter than the second and first intensities.

According to certain embodiments, as illustrated in FIGS. 5B and 5C, the processor 210 may analyze the preview image to determine that a shadow 420 of the electronic apparatus 100 or the user has been produced due to the light source around the electronic apparatus 100. According to certain embodiments, the processor 210 may differently determine the intensity of the shadow depending on the brightness of the light source. For example, when the brightness of the light source is determined to be second brightness, third brightness, and fourth brightness, respectively, the processor 210 may differently determine the intensity of the shadow, respectively.

Figure 6A:
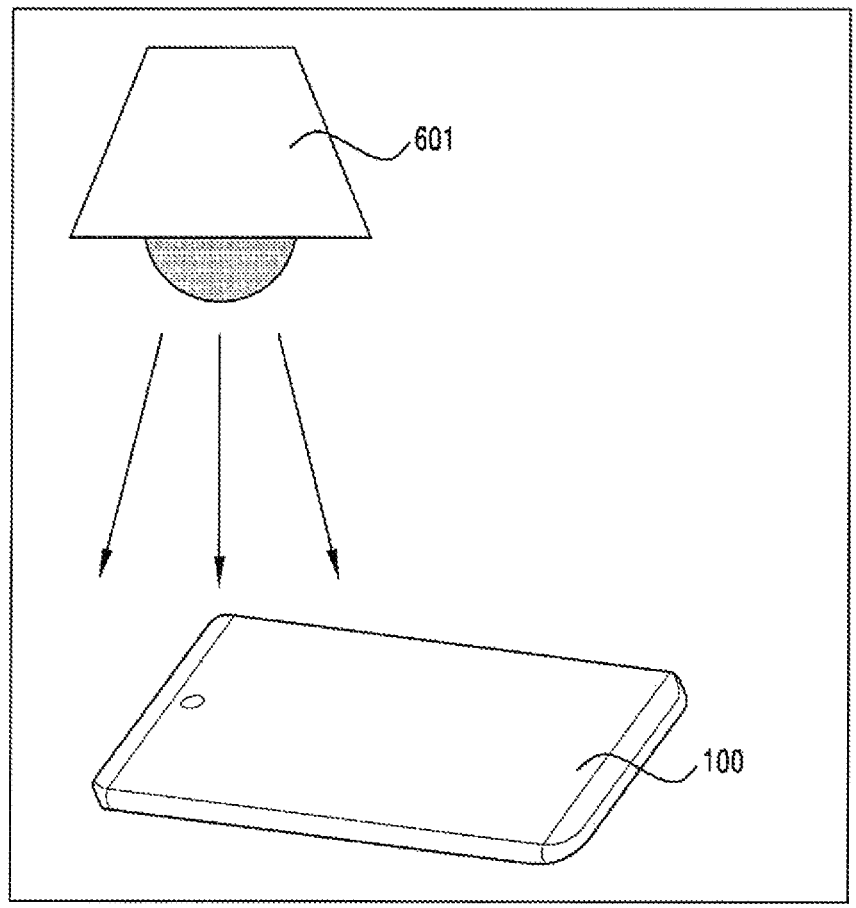
FIG. 6A illustrates the case in which there is a direct light source around an electronic apparatus according to an embodiment.

FIG. 6A illustrates the case in which there is a direct light source disposed in the environment of an electronic apparatus according to an embodiment.

Referring to FIG. 6A, when a direct light source 601 is present, an electronic apparatus 100 according to an embodiment may display an image acquired by driving a camera (e.g., the front camera 215 or the rear camera 220 in FIG. 2) as a preview image on a display (e.g., the display 240 in FIG. 2). For example, the direct light source 601 may include a light source for emitting light. The emitted light may travel in a straight line towards the front camera 215, originating from a side opposite the front camera 215. Furthermore, for example, the direct light source 601 may include a light source for emitting light in a straight line toward the rear camera 220 from a side opposite the rear camera 220.

According to an embodiment, when the preview image is analyzed and a shadow of the electronic apparatus 100 or a user is determined to have been produced due to the direct light source 601, the processor 210 may detected a shadow of a certain intensity due to the illuminance value of the direct light source 601. That is, the higher the brightness of the direct light source 601, the darker the shadow will be.

Figure 6B:
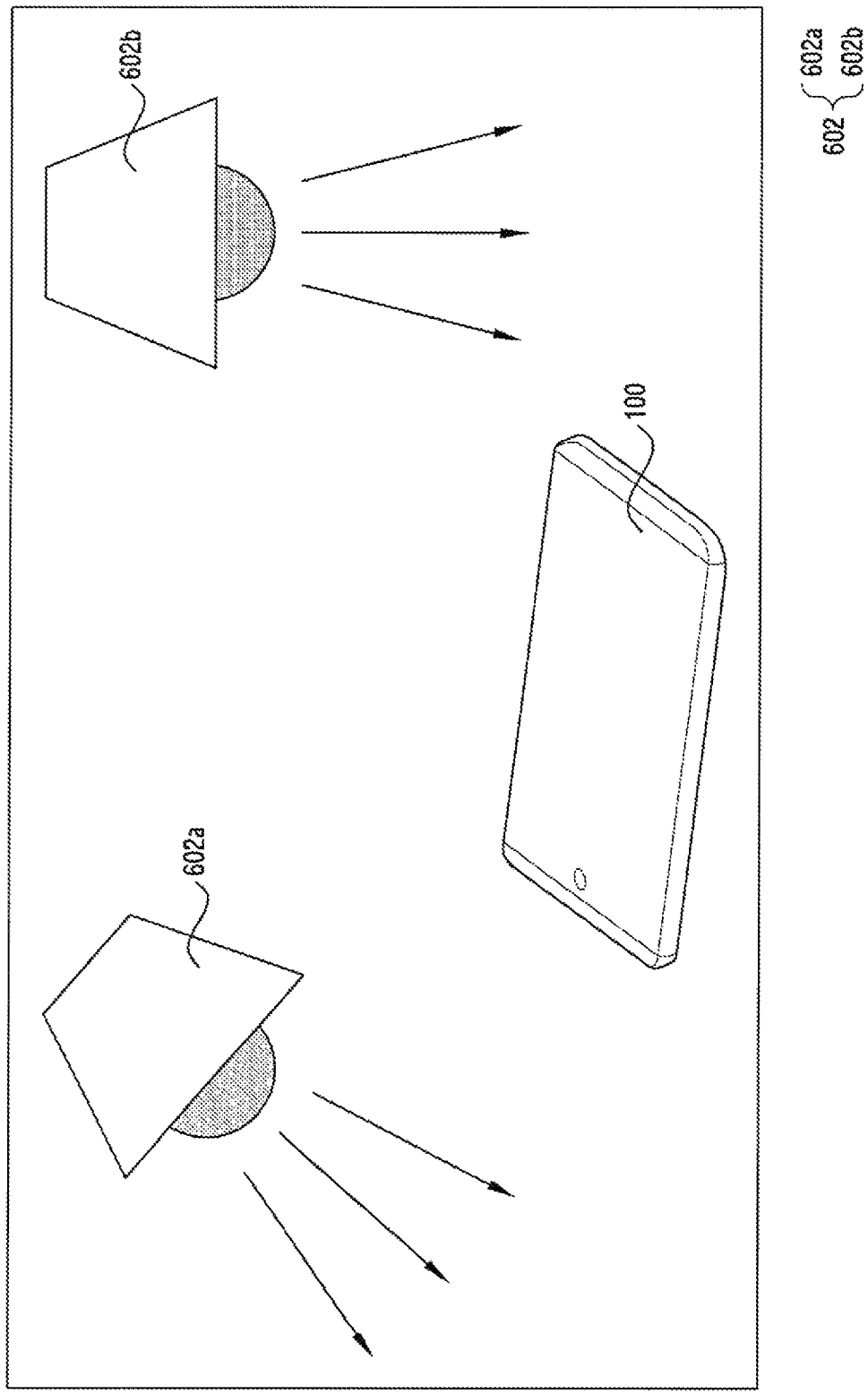
FIG. 6B illustrates the case in which there is an indirect light source around an electronic apparatus according to an embodiment.

FIG. 6B illustrates the case in which an indirect light source 602 is disposed in the environment of an electronic apparatus according to an embodiment.

Referring to FIG. 6B, when the indirect light source 602 is present, an electronic apparatus 100 according to an embodiment may display an image acquired by driving a camera (e.g., the front camera 215 or the rear camera 220 in FIG. 2) as a preview image on a display (e.g., the display 240 in FIG. 2). For example, the indirect light source 602 may include a light source for emitting light in a direction, which is not a straight line, toward the front camera 215 from a side opposite the front camera 215. Furthermore, for example, the indirect light source 602 may include a light source for emitting light, which is not a straight line, toward the rear camera 220 from a side opposite the rear camera 220. Furthermore, for example, the indirect light source 602 may include a first indirect light source 602a, positioned at a first angle with the electronic apparatus 100, and a second indirect light source 602b, positioned at a second angle with the electronic apparatus 100.

According to an embodiment, when the preview image is analyzed and a shadow of the electronic apparatus 100 or a user is determined to have been produced due to the indirect light source 602, a shadow may be produced having a lesser intensity compared to that of FIG. 6A. The reasoning the higher the brightness of an indirect light source 602 is, the lighter the resulting shadow will be.

Figure 7:
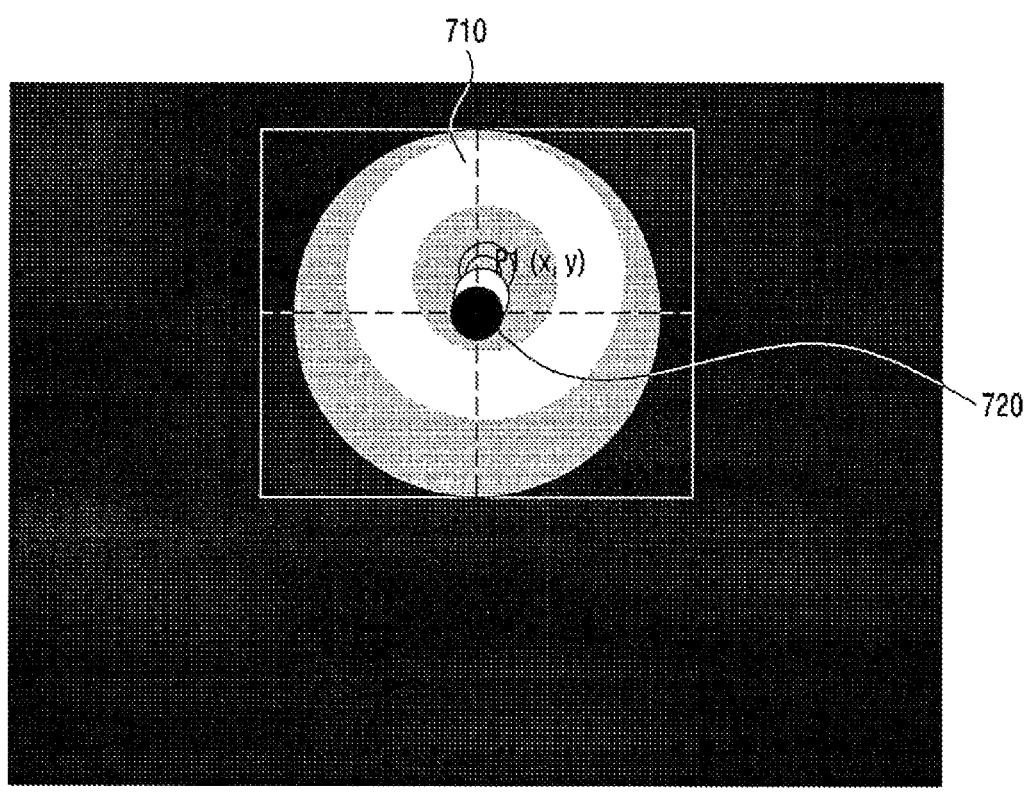
FIG. 7 illustrates that electronic apparatus according to an embodiment identifies a position of the center of a light source.

FIG. 7 illustrates that an electronic apparatus according to an embodiment identifies a position of the center of a light source.

Referring to FIG. 7, the processor 210 according to an embodiment may identify an origination direction of a light source 710 in the environment of the electronic apparatus 100. According to an embodiment, the processor 210 may analyze an image acquired through a front camera or a vision sensor to identify the direction of the light source 710. According to an embodiment, the processor 210 may identify a center 720 (e.g., P1(x, y)) of the light source 710 by analyzing an acquired image or by using artificial intelligence (AI) algorithm.

According to an embodiment, the processor 210 may determine a position of the electronic apparatus 100, relative to the center 720 of the light source and the position of a shadow. According to an embodiment, the processor 210 may analyze the image acquired through the front camera or the vision sensor to identify a number of light sources 710.

According to an embodiment, when it is determined that a shadow has been produced, the processor 210 may calculate the intensity of a shadow, based on the direction and the number of light sources 710.

Figure 8A:
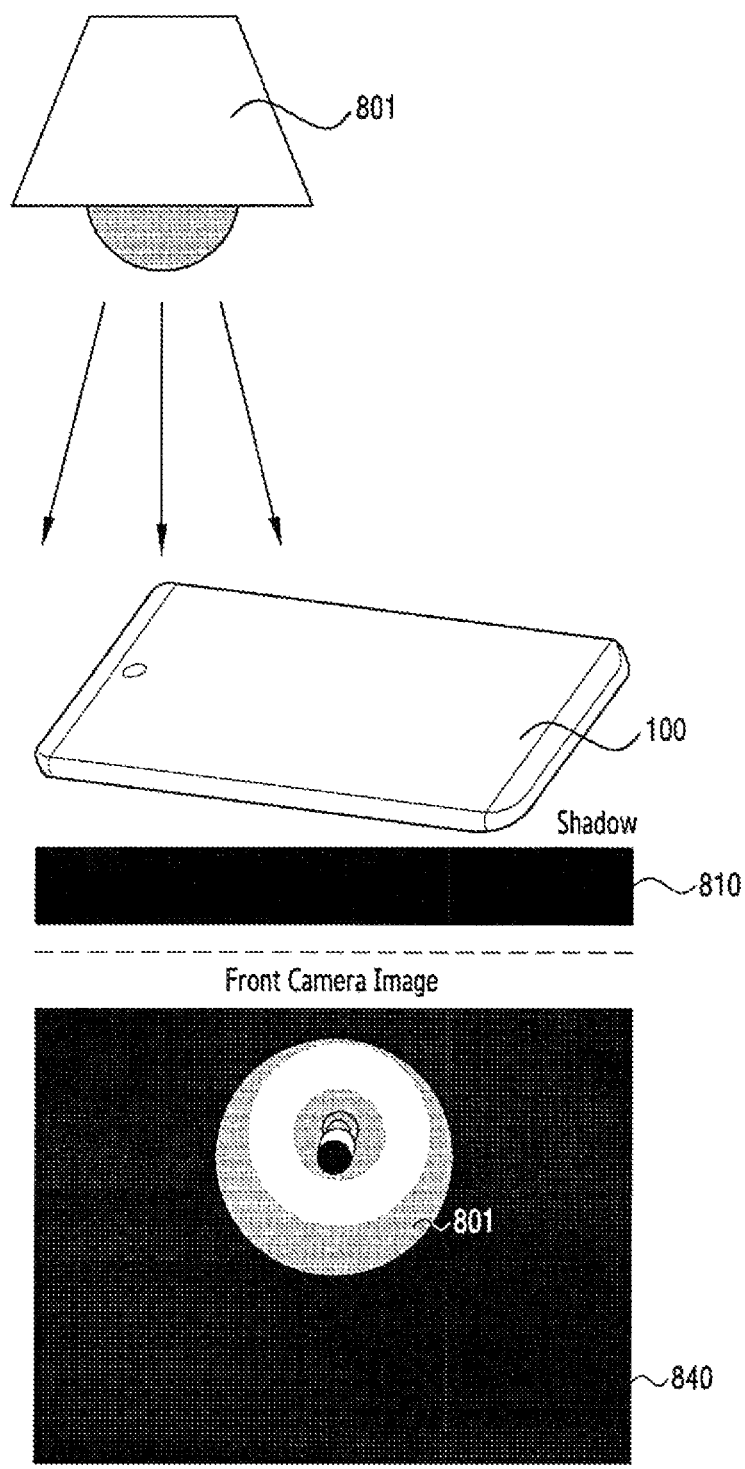
FIGS. 8A to 8C illustrate the intensity of a shadow according to the positions and the number of light sources around an electronic apparatus according to certain embodiments.
Figure 8B:
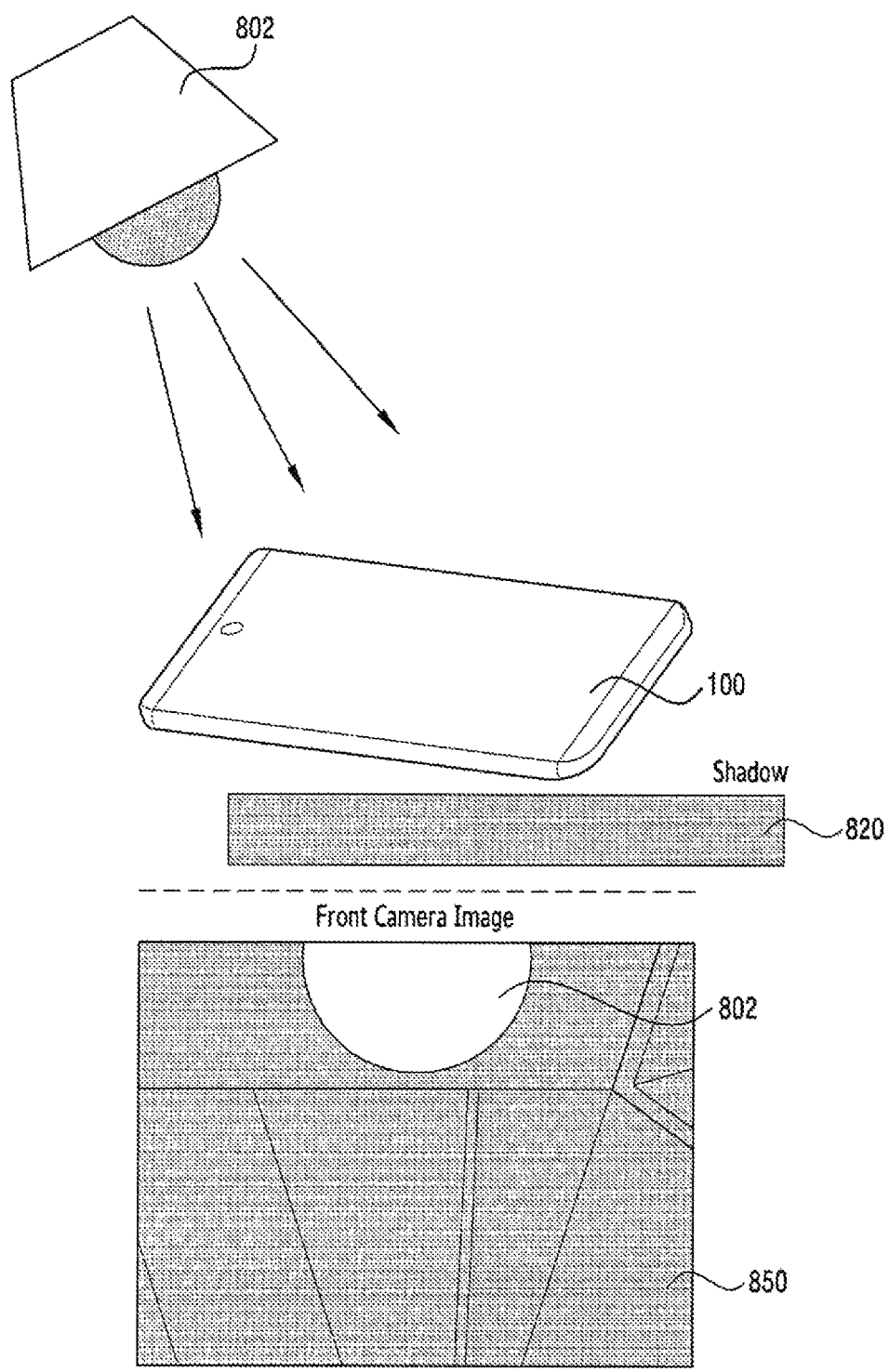
Figure 8C:
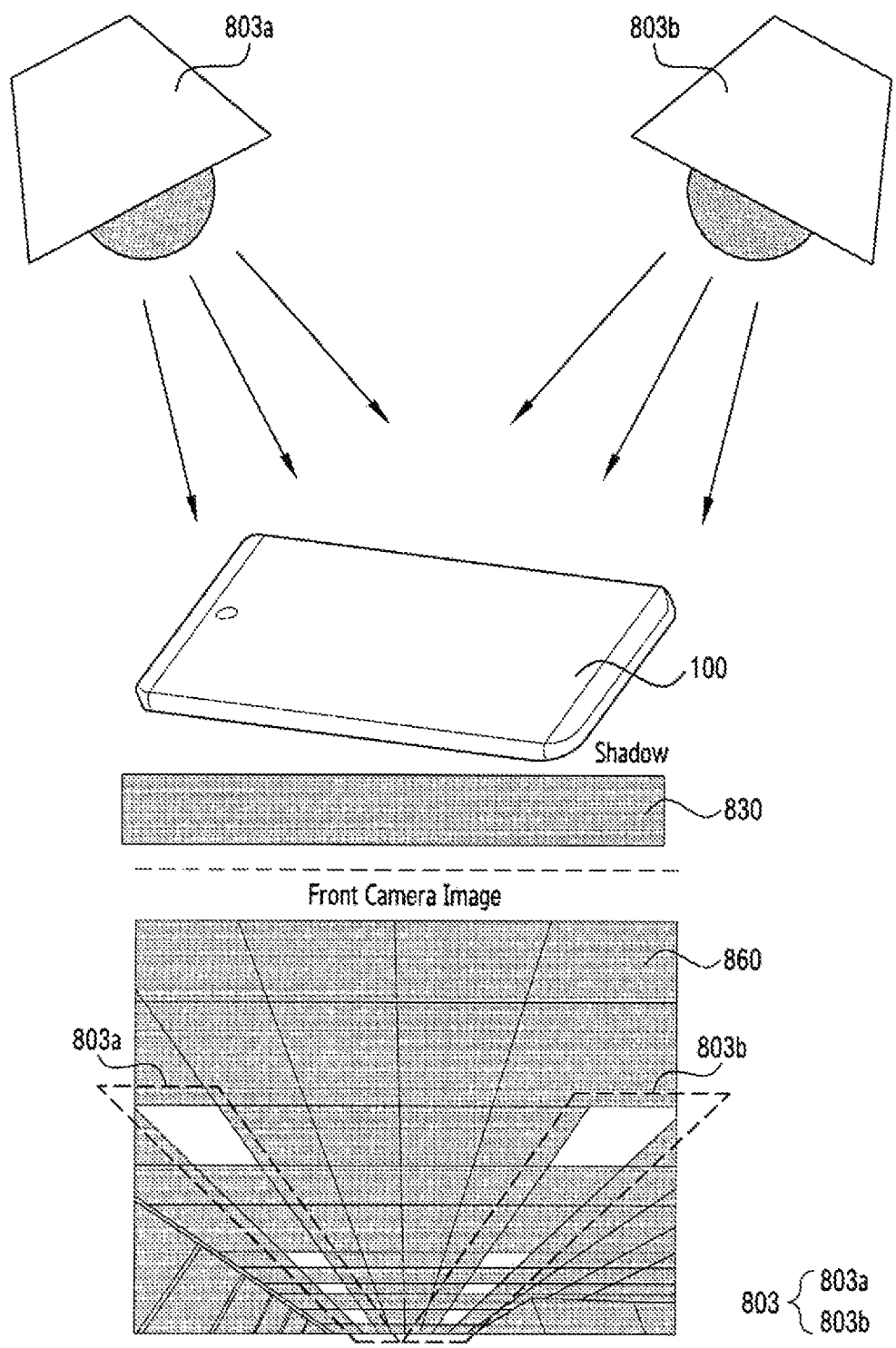

FIGS. 8A to 8C illustrate the intensity of a shadow according to positions and a number of light sources disposed around an electronic apparatus according to certain embodiments.

Referring to FIG. 8A, when a direct light source 801 is present, an electronic apparatus 100 according to an embodiment may display an image acquired by driving a camera (e.g., the rear camera 220 in FIG. 2) as a preview image on a display (e.g., the display 240 in FIG. 2) which may capture the direct light source 801. For example, the direct light source 801 may emit light in a straight line toward the rear camera 220 from a side opposite the rear camera 220 (e.g., from the side of the front camera).

According to an embodiment, the processor 210 may analyze the preview image to determine that a shadow 810 of the electronic apparatus and/or a user has been produced due to the presence of the direct light source 801. According to an embodiment, the processor 210 may utilize a front camera to acquire an image 840 including the direct light source 801.

According to an embodiment, the processor 210 may use the front camera or a vision sensor thereof to calculate the brightness of the direct light source 801. That is, it may be known that the brightness of the direct light source 801 will be proportional to the intensity of the shadow. For example, when a large amount of light enters the front camera, it may be determined that an exposure time should be short and the resultant shadow is dark (e.g., as compared to a threshold). Furthermore, for example, when a small amount of light enters the front camera, it may be determined that the exposure time should be long and the resultant shadow will be light.

According to an embodiment, the processor 210 may calculate (or determine), based on the result of analyzing the image 840 acquired using the front camera, that the intensity of the shadow 810 is a first intensity. According to an embodiment, the processor 210 may analyze the acquired image 840 to calculate, based on the direction and brightness of the direct light source 801, that the intensity of the shadow 810 is the first intensity. Thus, the flash brightness value may be adjusted accordingly.

Referring to FIG. 8B, when an indirect light source 802 is present, an electronic apparatus 100 according to an embodiment may display an image by driving a camera (e.g., the rear camera 220 in FIG. 2) as a preview image on a display (e.g., the display 240 in FIG. 2). For example, the indirect light source 802 may include a light source for emitting light at an angle that is indirectly incident towards the rear camera 220 from a side opposite the rear camera 220, as seen in FIG. 8.

According to an embodiment, the processor 210 may analyze the preview image to determine that a shadow 820 of the electronic apparatus and/or a user will be or is being produced. Due to incident the indirect light source 802. According to an embodiment, the processor 210 may use a front camera to acquire an image 850 including the indirect light source 802.

According to an embodiment, the processor 210 may use the front camera or a vision sensor to calculate the brightness of the indirect light source 802. According to an embodiment, the processor 210 may determine that the brightness of the indirect light source 802 is inversely proportional to the intensity of the shadow. For example, when a larger amount of light enters a rear camera, it may be determined that an exposure time should be short and the shadow is light (e.g., as compared to a threshold). Furthermore, for example, when a small amount of light enters the rear camera, it may be determined that the exposure time is long and the shadow is dark (e.g., as compared to a threshold).

According to an embodiment, the processor 210 may calculate (or determine), based on the result of analyzing the image 850 acquired using the front camera, that the intensity of the shadow 820 is a second intensity value lower than the first intensity value. According to an embodiment, the processor 210 may analyze the acquired image 850 to calculate, based on the direction and brightness of the indirect light source 802, that the intensity of the shadow 820 is the second intensity value.

Referring to FIG. 8C, when there is an indirect light source 803, an electronic apparatus 100 according to an embodiment may display an image acquired by driving a camera (e.g., the rear camera 220 in FIG. 2) as a preview image on a display (e.g., the display 240 in FIG. 2). For example, the indirect light source 803 may include a light source for emitting light in a direction, which is not a straight line, toward the rear camera 220 from a side opposite the rear camera 220. Furthermore, for example, the indirect light source 803 may include a first indirect light source 803a, positioned at a first angle with the electronic apparatus 100, and a second indirect light source 803b, positioned at a second angle with the electronic apparatus 100.

According to an embodiment, the processor 210 may analyze the preview image to determine that a shadow 830 of the electronic apparatus and/or a user is produced due to the plurality of indirect light sources 803. According to an embodiment, the processor 210 may use a front camera to acquire an image 860 including the indirect light sources 803. According to an embodiment, the processor 210 may calculate (or determine), based on the result of analyzing the image 860 acquired using the front camera, that the intensity of the shadow 830 is a third intensity value lower than the second intensity value.

Figure 9:
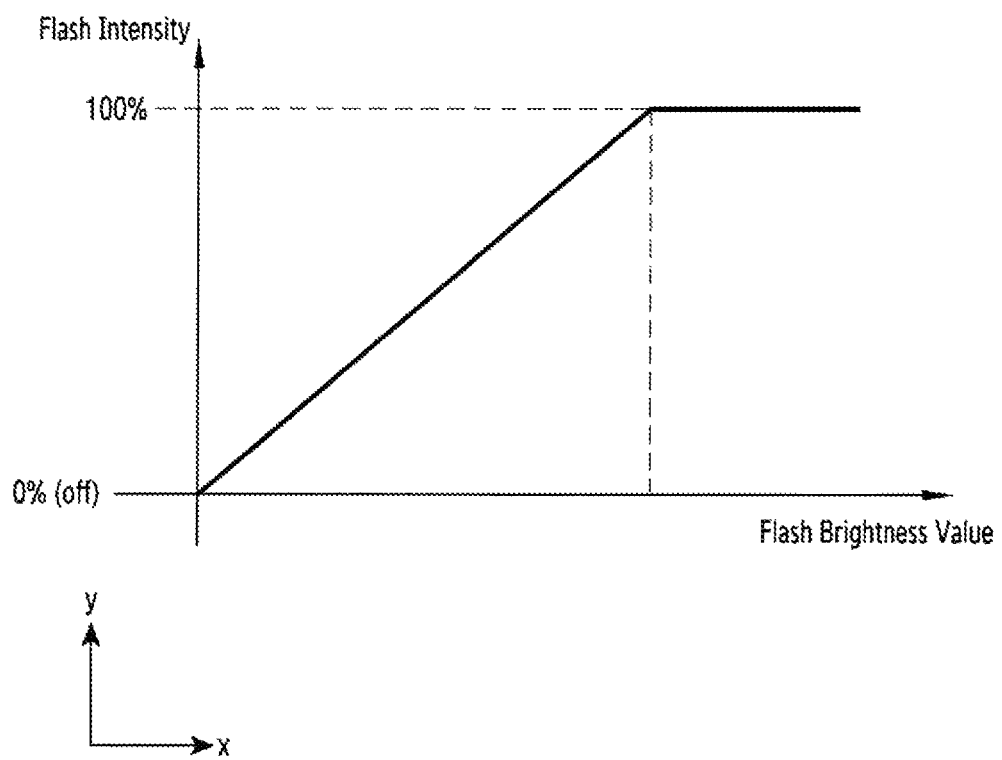
FIG. 9 illustrates flash intensity based on a flash brightness value determined in an electronic apparatus according to an embodiment.

FIG. 9 illustrates flash intensity as based on a flash brightness value determined in an electronic apparatus according to an embodiment.

Referring to FIG. 9, the X axis indicates the brightness of a flash determined by a processor, and the Y axis indicates flash intensity based on a determined flash brightness.

According to an embodiment, the processor 210 may determine the brightness of a flash, based on the intensity of a shadow of the electronic apparatus due to a light source and/or the reflectance of a subject. According to an embodiment, the processor 210 may control the light-emitting module 250 such that the brightness of the flash is proportional to the intensity of the shadow and inversely proportional to the reflectance of the subject. For example, the processor 210 may determine the brightness of the flash to become higher as the intensity of the shadow increases. Furthermore, for example, the processor 210 may determine the brightness of the flash to become lower as the reflectance of the subject increases.

According to an embodiment, the processor 210 may determine the intensity of the flash for image acquisition, based on the determined brightness of the flash. For example, when the determined brightness of the flash is lower than a threshold value, the processor 210 may determine the intensity of the flash to be proportional to the brightness of the flash. According to an embodiment, when the brightness of the flash is equal to or higher than the threshold value, the processor 210 may determine intensity of the flash to be the maximum intensity. According to an embodiment, the processor 210 may acquire an image to which the determined intensity of the flash is applied.

Figure 10:
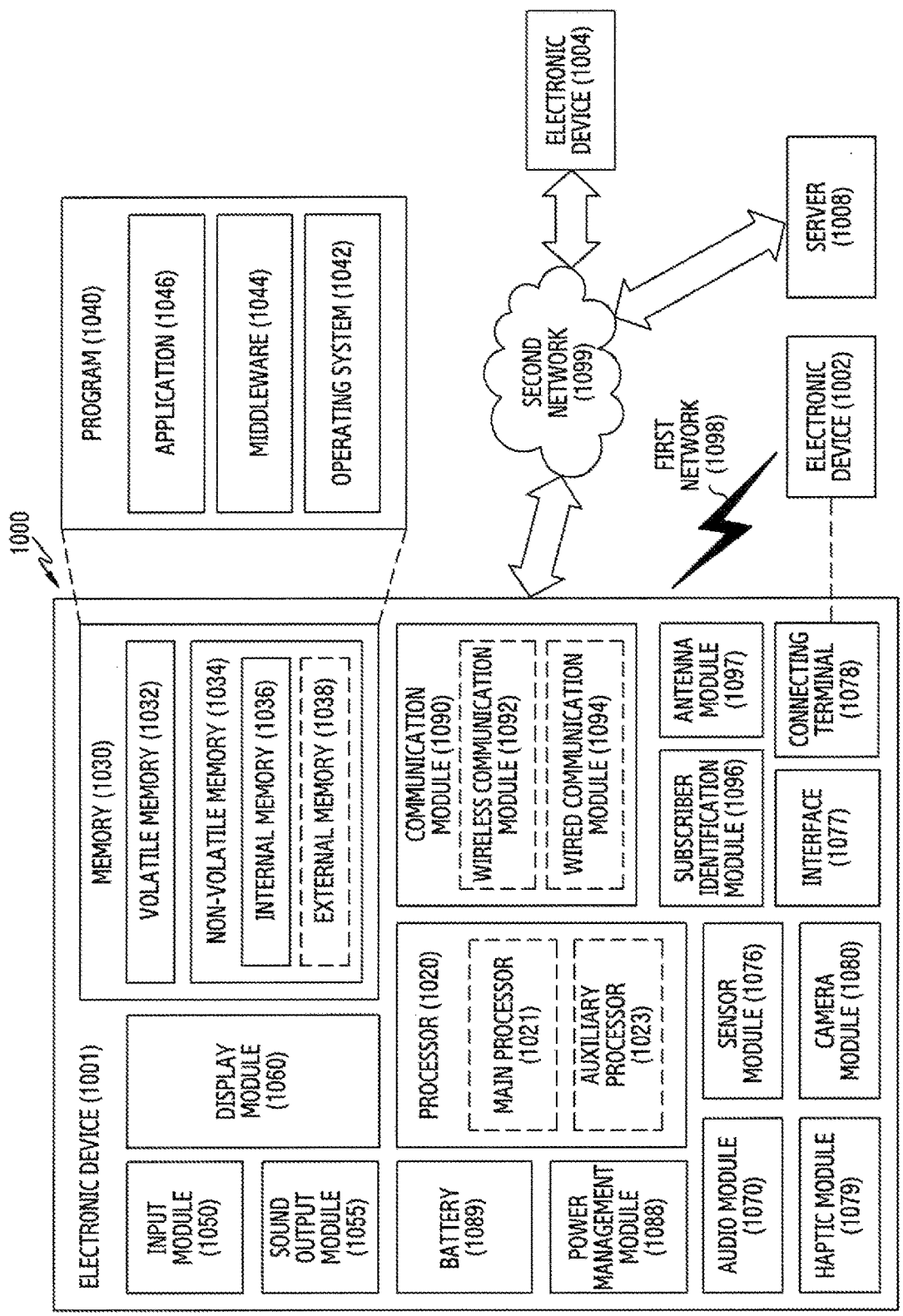
FIG. 10 is a block diagram of an electronic apparatus in a network environment according to an embodiment.

FIG. 10 is a block diagram illustrating an electronic device 1001 (e.g. the electronic apparatus 100 of FIG. 2) in a network environment 1000 according to certain embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020 (e.g. the processor 210 of FIG. 2), memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module(SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly.

According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™ wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element implemented using a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to certain embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra-low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 11:
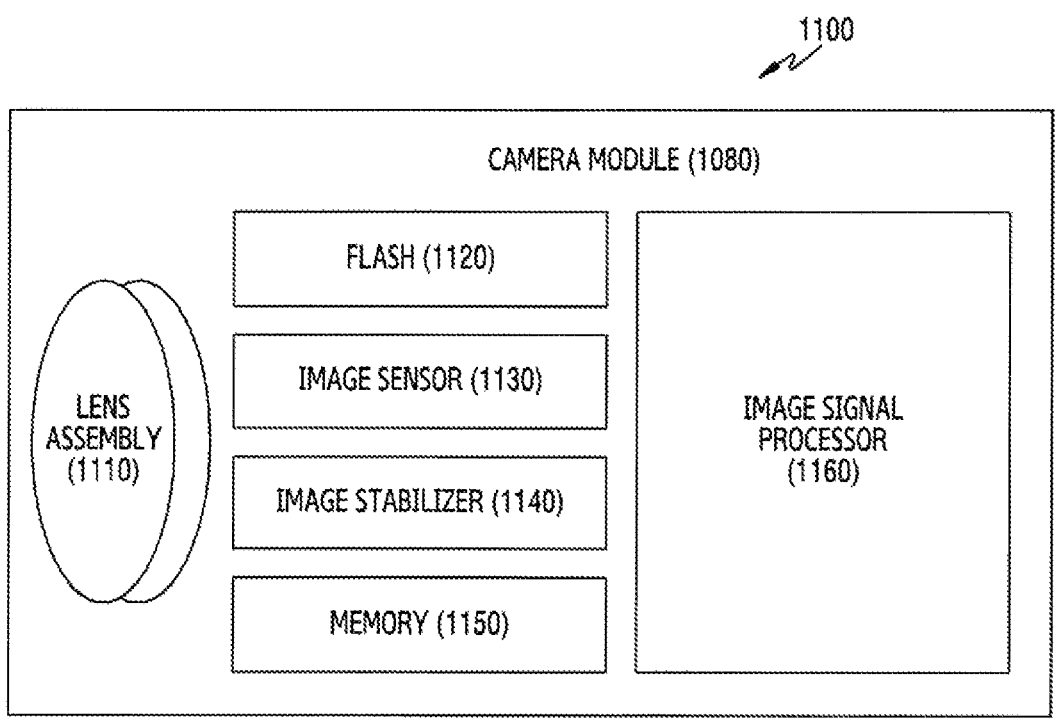
FIG. 11 is a block diagram illustrating a camera module according to an embodiment.

FIG. 11 is a block diagram 1100 illustrating the camera module 1080 according to certain embodiments. Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display device 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display device 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

As described above, an electronic apparatus (e.g., the electronic apparatus 100 in FIG. 2) according to an embodiment may include at least one camera (e.g., the front camera 215 or the rear camera 220 in FIG. 2), a distance sensor, an illumination sensor, a display (e.g., the display 240 in FIG. 2), a light-emitting module (e.g., the light-emitting module 250 in FIG. 2) configured to generate a flash while capturing an image by using the at least one camera, and at least one processor (e.g., the processor 210 in FIG. 2) electrically connected to the at least one camera, the distance sensor, the illumination sensor, the display, and the light-emitting module, wherein the at least one processor displays an image acquired by driving the at least one camera as a preview image on the display, uses the distance sensor or the at least one camera to acquire information about the distance between the electronic apparatus and at least one object included in the preview image, uses the illumination sensor to acquire information about the brightness of a light source around the electronic apparatus, determines, based on the acquired distance information and the acquired brightness information, whether a shadow of the electronic apparatus is produced in the field of view of the at least one camera due to the light source, and, in response to determining the shadow of the electronic apparatus to have been produced, determines the brightness of the flash so as to remove the shadow or reduce the shadow.

According to an embodiment, the at least one processor may determine a shadow to have been produced when the distance between the electronic apparatus and the at least one object included in the preview image is determined to be equal to or less than a threshold value, based on the acquired distance information.

According to an embodiment, the at least one processor may determine a shadow to have been produced when the brightness of the light source around the electronic apparatus is determined to be equal to or higher than a threshold value, based on the acquired brightness information.

According to an embodiment, the at least one processor may determine, based on at least one of the distance information or the brightness information, the intensity of the shadow when the shadow is determined to be produced.

According to an embodiment, the at least one processor may determine that the intensity of the shadow becomes higher as the distance between the electronic apparatus and the at least one object included in the preview image becomes shorter.

According to an embodiment, the at least one processor may determine that the intensity of the shadow becomes higher as the brightness of the light source around the electronic apparatus becomes higher.

According to an embodiment, the at least one processor may analyze the preview image to determine the reflectance of the at least one object included in the preview image, and may determine the brightness of the flash, based on the determined reflectance and the determined intensity of the shadow.

According to an embodiment, the at least one processor may determine the brightness of the flash such that the brightness of the flash is proportional to the determined intensity of the shadow and inversely proportional to the determined reflectance.

According to an embodiment, the at least one camera may include a first camera facing a first direction and a second camera facing a second direction opposite to the first direction, and the at least one processor may identify, through the first camera, at least one among the position of the center of the light source, the relative position of the electronic apparatus according to the position of the center of the light source, the position of the shadow, and the number of the light sources.

According to an embodiment, the at least one processor may identify the position of the center of the light source by analyzing the preview image or by using artificial intelligence (AI).

As described above, a method for operating an electronic apparatus (e.g., the electronic apparatus 100 in FIG. 2) according to an embodiment may include displaying an image acquired by driving at least one camera (e.g., the front camera 215 or the rear camera 220 in FIG. 2) as a preview image on a display (e.g., the display 240 in FIG. 2), using a distance sensor or the at least one camera to acquire information about the distance between the electronic apparatus and at least one object included in the preview image, using an illumination sensor to acquire information about the brightness of a light source around the electronic apparatus, determining, based on the acquired distance information and the acquired brightness information, whether a shadow of the electronic apparatus is produced in the field of view of the at least one camera due to the light source, and, in response to determining the shadow of the electronic apparatus to have been produced, determining the brightness of a flash so as to remove the shadow or reduce the shadow.

The method for operating the electronic apparatus according to an embodiment may include determining a shadow to have been produced when the distance between the electronic apparatus and the at least one object included in the preview image is determined to be equal to or less than a threshold value, based on the acquired distance information.

The method for operating the electronic apparatus according to an embodiment may include determining a shadow to have been produced when the brightness of the light source around the electronic apparatus is equal to or higher than a threshold value, based on the acquired brightness information.

The method for operating the electronic apparatus according to an embodiment may include determining, based on at least one of the distance information or the brightness information, the intensity of the shadow when the shadow is determined to be produced.

According to an embodiment, the determining of the intensity of the shadow may include determining that the intensity of the shadow becomes higher as the distance between the electronic apparatus and the at least one object included in the preview image becomes shorter.

According to an embodiment, the determining of the intensity of the shadow may include determining that the intensity of the shadow becomes higher as the brightness of the light source around the electronic apparatus becomes higher.

According to an embodiment, the determining of the brightness of the flash may include analyzing the preview image to determine the reflectance of the at least one object included in the preview image, and determining the brightness of the flash, based on the determined reflectance and the determined intensity of the shadow.

According to an embodiment, the at least one camera may include a first camera facing a first direction and a second camera facing a direction opposite to the first direction, and the method for operating the electronic apparatus may include identifying, through the first camera, at least one among the position of the center of the light source, the relative position of the electronic apparatus according to the position of the center of the light source, the position of the shadow, and the number of the light sources.

The method for operating the electronic apparatus according to an embodiment, the identifying of the position of the center of the light source may include identifying the position of the center of the light source by analyzing the preview image or by using AI.

As described above, in a recording medium configured to store instructions readable by at least one processor (e.g., the processor 210 in FIG. 2) of an electronic apparatus (e.g., the electronic apparatus 100 in FIG. 2) according to an embodiment, when the instructions are executed by the at least one processor, the at least one processor may display an image acquired by driving at least one camera as a preview image on a display, may use a distance sensor or the at least one camera to acquire information about the distance between the electronic apparatus and at least one object included in the preview image, may use an illumination sensor to acquire information about the brightness of a light source around the electronic apparatus, may determine, based on the acquired distance information and the acquired brightness information, whether a shadow of the electronic apparatus is produced in the field of view of the at least one camera due to the light source, and may determine, in response to determining the shadow of the electronic apparatus to have been produced, the brightness of a flash so as to remove the shadow or reduce the shadow.

What is claimed is:

1. An electronic apparatus, comprising:
   at least one camera;
   a distance sensor;
   an illumination sensor;
   a display;
   a light-emitting module configured to generate a flash; and
   at least one processor communicably coupled to the at least one camera, the distance sensor, the illumination sensor, the display, and the light-emitting module,
   wherein the at least one processor is configured to:
      display, on the display, an image acquired by driving the at least one camera as a preview image,
      acquire, via at least one of the distance sensor or the at least one camera, a distance between the electronic apparatus and at least one object depicted within the preview image,
      acquire, via the illumination sensor, a brightness of an environment around the electronic apparatus,
      based on the acquired distance and the acquired brightness, determine whether a shadow of the electronic apparatus is produced in a field of view of the at least one camera due to a light source around the electronic apparatus,
      in response to determining that the shadow of the electronic apparatus is produced:
         determine an intensity of the shadow of the electronic apparatus, and
         configure a brightness value for the flash based on the determined intensity of the shadow
      generate the flash through the light-emitting module based on the determined brightness value, and
      acquire, via the at least one camera, at least one image based on the generated flash.

2. The electronic apparatus of claim 1, wherein the shadow is detected when the acquired distance between the electronic apparatus and the at least one object depicted in the preview image is equal to or less than a threshold value.

3. The electronic apparatus of claim 1, wherein the shadow is detected based further on detecting that the brightness is equal to or higher than a threshold value.

4. The electronic apparatus of claim 1, wherein the at least one processor is configured to:
   when the shadow is detected, determine an intensity of the shadow based on at least one of the distance and the brightness.

5. The electronic apparatus of claim 4, wherein the intensity of the shadow increases in value as the distance between the electronic apparatus and the at least one object is reduced.

6. The electronic apparatus of claim 4, wherein the intensity of the shadow increases in value as the brightness increases.

7. The electronic apparatus of claim 4, wherein the at least one processor is configured to:
   analyze the preview image to determine reflectance of the at least one object depicted in the preview image,
   wherein the brightness value of the flash is configured based at least in part on the determined reflectance and the determined intensity of the shadow.

8. The electronic apparatus of claim 7, wherein the brightness value of the flash is configured to be proportional to the determined intensity of the shadow and inversely proportional to the determined reflectance.

9. The electronic apparatus of claim 1, wherein the at least one camera includes a first camera facing a first direction, and a second camera facing a second direction opposite to the first direction, and
   wherein the at least one processor is configured to:
      identify, through the first camera, at least one of:
         a position of a center of the light source, and a relative position of the electronic apparatus according to the position of the center of the light source,
         a position of the shadow,
         or a number of light sources when a plurality of light sources is detected.

10. The electronic apparatus of claim 9, wherein the at least one processor is configured to identify a position of the center of the light source by analyzing the preview image or via artificial intelligence analysis.

11. A method for operating an electronic apparatus, the method comprising:
    displaying, via a display, an image acquired by driving at least one camera as a preview image;
    acquiring, via at least one of a distance sensor or the at least one camera, a distance between the electronic apparatus and at least one object depicted in the preview image;
    acquiring, using an illumination sensor, a brightness of a light source of light incident to an environment captured in a field-of-view (FOV) of the at least one camera;
    detecting, based on the acquired distance and the acquired brightness, whether a shadow of the electronic apparatus generated at least in part by the light source is disposed within the FOV of the at least one camera;
    in response to detecting the shadow of the electronic apparatus is produced:
    determining an intensity of the shadow of the electronic apparatus; and
       configuring a brightness value for a flash based on the determined intensity of the shadow
       generating the flash through, light-emitting module, based on the determined brightness value, and
       acquiring, via the at least one camera, at least one image based on the generated flash.

12. The method of claim 11, wherein the shadow is detected when the acquired distance between the electronic apparatus and the at least one object depicted in the preview image is equal to or less than a threshold value.

13. The method of claim 11, wherein the shadow is detected based further on detecting that the brightness of the light source is equal to or higher than a threshold value.

14. The method of claim 11, further comprising: when the shadow is detected, determining an intensity of the shadow based on at least one of the distance and the brightness of the light source.

15. The method of claim 14, wherein the intensity of the shadow increases in value as the distance between the electronic apparatus and the at least one object is reduced.

16. The method of claim 14, wherein the intensity of the shadow increases in value as the brightness of the light source increases.

17. The method of claim 14, further comprising:
    analyzing the preview image to determine reflectance of the at least one object depicted in the preview image,
    wherein the brightness of the flash is configured based at least in part on the determined reflectance and the determined intensity of the shadow.

18. The method of claim 11, wherein the at least one camera includes a first camera facing a first direction, and a second camera facing a second direction opposite to the first direction, and wherein the method further comprises:
identifying, through the first camera, at least one of:
a position of a center of the light source, and a relative position of the electronic apparatus according to the position of the center of the light source,
a position of the shadow,
or a number of light sources when a plurality of light sources is detected.

19. The method of claim 18, further comprising:
identifying a position of the center of the light source by analyzing the preview image or via artificial intelligence analysis.

20. A non-transitory recording medium configured to store instructions that are read an executed by at least one processor of an electronic apparatus to cause the electronic apparatus to:
display, on the display, an image acquired by driving a at least one camera as a preview image,
acquire, via at least one of a distance sensor or the at least one camera, a distance between the electronic apparatus and at least one object depicted within the preview image,
acquire, via an illumination sensor, a brightness of a light source having light incident to an environment captured in a field-of-view (FOV) of the at least one camera,
based on the acquired distance and the acquired brightness, detect whether a shadow of the electronic apparatus generated at least in part by the light source is disposed within the FOV of the camera,
in response to detecting the shadow of the electronic apparatus:
determine an intensity of the shadow of the electronic apparatus, and
configure a brightness value for a flash based on the determined intensity of the shadow
generate the flash through light-emitting module based on the determined brightness value, and
acquire, via the at least one camera, at least one image based on the generated flash.

* * * * *